United States Patent

Muth et al.

(10) Patent No.: US 9,749,082 B2
(45) Date of Patent: Aug. 29, 2017

(54) OPTICAL COMMUNICATION SYSTEM WITH A HIERARCHICAL BRANCH CONFIGURATION

(71) Applicant: Tyco Electronics Subsea Communications LLC, Eatontown, NJ (US)

(72) Inventors: Edwin Muth, Aberdeen, NJ (US); Adnan Akhtar, Howell, NJ (US)

(73) Assignee: TYCO ELECTRONICS SUBSEA COMMUNICATIONS LLC, Eatontown, NJ (US)

( * ) Notice: Subject to any disclaimer, the term of this patent is extended or adjusted under 35 U.S.C. 154(b) by 0 days.

(21) Appl. No.: 14/631,815

(22) Filed: Feb. 25, 2015

(65) Prior Publication Data

US 2016/0248538 A1 Aug. 25, 2016

(51) Int. Cl.
*H04J 14/02* (2006.01)
*H04B 10/80* (2013.01)

(52) U.S. Cl.
CPC ...... *H04J 14/0286* (2013.01); *H04J 14/0201* (2013.01); *H04J 14/0204* (2013.01); *H04J 14/028* (2013.01); *H04B 10/80* (2013.01)

(58) Field of Classification Search
CPC .............. H04J 14/0201–14/022; H04J 14/0278–14/0286; H04J 14/0204–14/0205; H04J 14/216; H04J 14/028–14/0282
See application file for complete search history.

(56) References Cited

U.S. PATENT DOCUMENTS

| 6,204,943 | B1 * | 3/2001 | Hamel | H04J 14/0227 370/222 |
| 2002/0063921 | A1 * | 5/2002 | Terahara | H04B 10/035 398/30 |
| 2010/0008666 | A1 | 1/2010 | Kovsh et al. | |
| 2011/0064409 | A1 * | 3/2011 | Grobe | H04B 10/275 398/58 |
| 2012/0213517 | A1 * | 8/2012 | Ji | H04J 14/0212 398/48 |
| 2012/0263476 | A1 * | 10/2012 | Sabet | H04B 10/0705 398/104 |
| 2013/0330086 | A1 * | 12/2013 | Berlin | H04L 12/10 398/115 |

FOREIGN PATENT DOCUMENTS

WO 00/76105 12/2000

OTHER PUBLICATIONS

European Search Report dated Aug. 5, 2016 received in corresponding European Patent Application No. 16157094.0.

* cited by examiner

*Primary Examiner* — Leslie Pascal
*Assistant Examiner* — Casey Kretzer (57) ABSTRACT

An optical communication system with a hierarchical branch configuration. The system includes first and second cable landing stations coupled to a trunk path in an optical cable. At least one hub-node is coupled to the trunk path through an associated hub-node branching unit. Sub-nodes are coupled the hub-nodes through associated sub-node branching units and sub-node paths in the optical cable. Sub-node signals may be communicated between the sub-nodes and the hub-nodes without being provided on the trunk path.

20 Claims, 4 Drawing Sheets

OPTICAL COMMUNICATION SYSTEM WITH A HIERARCHICAL BRANCH CONFIGURATION

TECHNICAL FIELD

The present disclosure relates to optical communication systems and in particular, to an optical communication system with a hierarchical branch configuration.

BACKGROUND

In optical communication systems a single optical fiber may be used to carry multiple optical signals. Each of the optical signals may be modulated on a separate associated wavelength referred to as a channel. The optical signals may be multiplexed to form a wavelength division multiplexed (WDM) signal that is transmitted on the optical fiber. WDM systems may have a high traffic capacity. For example, a WDM system may carry 100 channels or more at 10 to 100 gigabits per second (hereinafter Gb/s) or higher.

WDM optical communication systems may be provided in a trunk and branch configuration including a trunk path extending between trunk terminals and branch paths coupled to the trunk path by associated branching units and extending between the trunk path and associated branch terminals. The system may be configured to provide independence between the branch terminals while maximizing transmission capacity on the trunk and branch paths.

Some trunk and branch optical communication systems do not require maximum capacity on the trunk and branch paths. For example, some optical communication systems may include a large number, e.g. sixty-four or more, of branch paths connecting two shore landing stations to associated oil platforms and other offshore resources (referred to herein as nodes) and may thus place a high value on the number of supported connections.

The reliability of connectivity from each node to the shore may be critical in such applications and may be achieved by sending a wavelength from each node in an "east" direction toward one shore station, while the same data is replicated on a wavelength going "west" to the other shore station. The terms "east" and "west" are used herein to describe opposite directions of transmission in an optical cable and not necessarily to describe compass direction.

One challenge in these systems may by the overall loss on the trunk path resulting from a large number of nodes and associated branching units. Each branching unit (BU) coupled to the trunk path for supporting a branch path and an associated node contributes loss, e.g. 3 dB or higher, to the overall loss on the trunk path. The loss may require compensation by addition of optical amplifiers to the trunk path. Each optical amplifier may compensate for the loss associated with only a few of the nodes coupled to the trunk path.

BRIEF DESCRIPTION OF THE DRAWINGS

Reference should be made to the following detailed description which should be read in conjunction with the following figures, wherein like numerals represent like parts.

DETAILED DESCRIPTION

In general, the present disclosure provides an optical communication system with a hierarchical branch configuration. A trunk path extends between two cable landing stations (CLS). A plurality of hub-nodes are coupled to the trunk path through an associated branch path and branching unit. Sub-nodes are coupled to the hub-nodes through a sub-node path that does not include the trunk path. Data to/from the sub-nodes passes through the hub-nodes and is provided to the CLSs using the same wavelength as the hub-node(s). This may be viewed as a hierarchical configuration with the hub-nodes at a first level of the hierarchy, and the sub-nodes at a second level of the hierarchy. Redundant connectivity may be provided whereby each of the hub-nodes and sub-nodes communicates the same data to both of the CLSs.

With a configuration consistent with the present disclosure the trunk paths may be coupled to the branch paths only at each of the hub-nodes. Branching units associated with the sub-nodes couple the sub-nodes to one or more hub-nodes through a sub-node path that does not include the trunk path, thereby avoiding loss on the trunk path associated with sub-node branching units. In addition, the sub-nodes do not require a separate associated wavelength on the trunk path for communicating with the CLS, since they communicate with the CLS using the same wavelength used for associated hub-node(s).

Compared to known systems that include a separate branching unit coupled to the trunk path for each node and a separate wavelength associated with each node, a system consistent with the present disclosure allows for a reduction in the number of wavelengths required for connectivity of all the nodes in the system, since only the hub-nodes have associated wavelengths on the trunk path, and a reduction in the total loss on the trunk path due to fewer branching units coupled to the trunk path. This allows for use of higher capacity transponders for communication between the CLSs and the hub-nodes and for a reduction in the number of optical amplifiers required on the trunk path.

Figure 1:
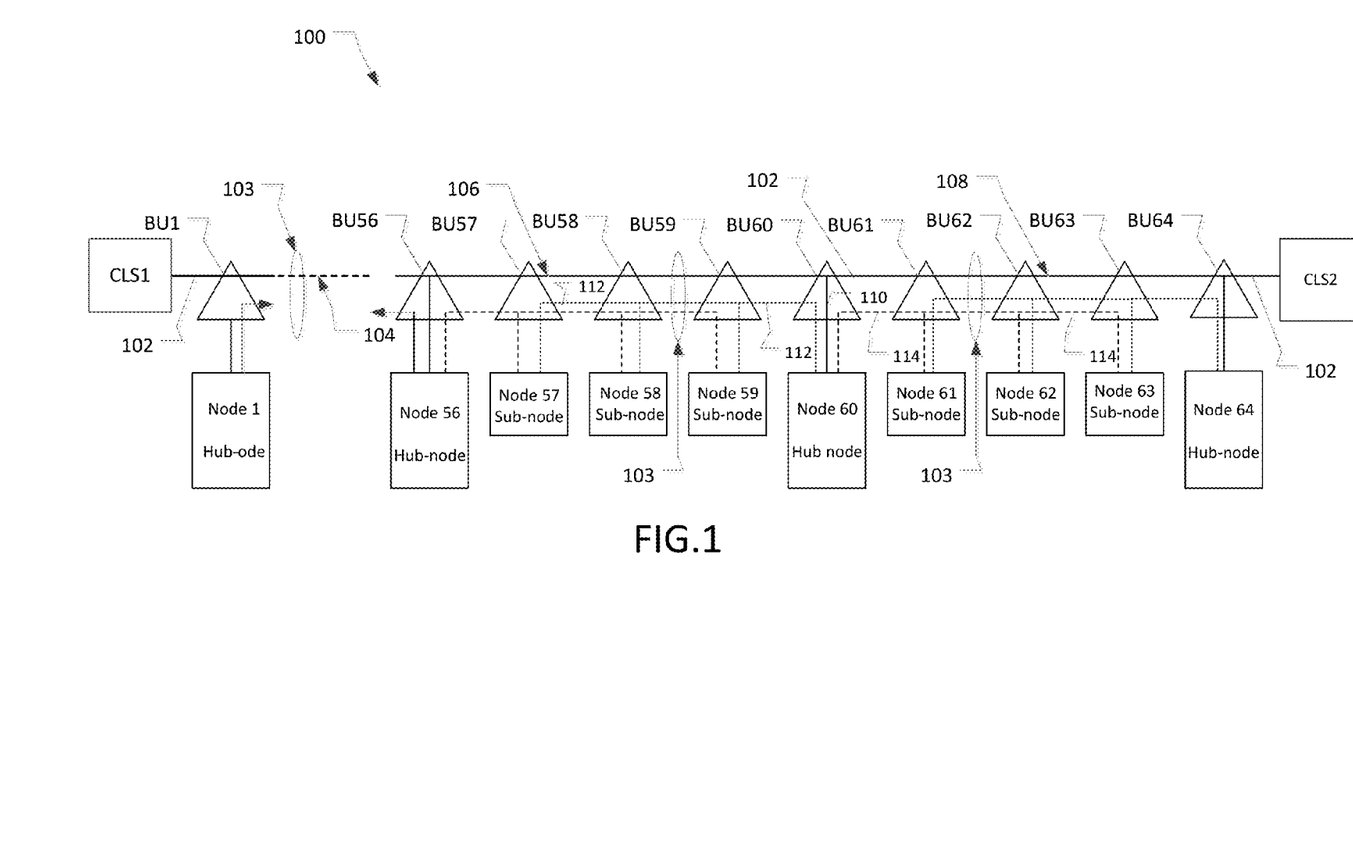
FIG. 1 is a schematic illustration of an optical communication system consistent with the present disclosure.

Turning now to FIG. 1, there is illustrated one example of an optical communication system 100 consistent with the present disclosure. The system 100 has been depicted in highly simplified form for ease of explanation. The optical communication system 100 includes cable landings stations CLS1 and CLS2 coupled to a trunk path 102 in an optical cable 103, a plurality of branching units BU1 . . . BU64, and a plurality of nodes, Node1 . . . Node 64.

The optical cable 103 includes a plurality of interconnected optical cable segments, e.g. cable segments 104, 106, 108. The cable segments, e.g. cable segments 104, 106, 108, may include one or more optical fiber pairs and may be coupled to one or more optical amplifiers/repeaters. For ease of illustration, optical amplifiers/repeaters are not shown in FIG. 1.

The optical cable 103 may span a body of water. When used to span a body of water, e.g. an ocean, the branching units BU1 . . . BU64 may be seated on the ocean floor and optical cable 103 may span between cable landing stations CLS1 and CLS2 positioned at beach landings. The nodes Node1 . . . Node 64 may be disposed on land and/or on offshore platforms, such as oil drilling platforms.

The trunk path 102 may be established by one or more optical fiber pairs within the optical cable 103, and allows for bi-directional communication between the cable landing stations CLS1, CLS2. The cable landing stations CLS1, CLS2 may include known optical equipment for sending and receiving WDM optical signals to/from the trunk path 102.

Some of the nodes, e.g. Node 1, Node 56, Node 60, Node 64 are configured as hub-nodes and other nodes, e.g. Nodes 57 . . . Node 59 and Nodes 61 . . . Node 63, are configured as sub-nodes. Although the illustrated exemplary embodiment includes sixty-four nodes Node1 . . . Node 64 and associated branching units BU1 . . . BU64, any number of nodes and branching units may be provided in a system consistent with the present disclosure.

Each of the hub-nodes, e.g. Node 1, Node 56, Node 60, Node 64, is coupled to the trunk path 102 by an associated branch path, e.g. path 110 associated with Node 60, and an associated one of the branching units, e.g. BU60 associated with Node 60. Of the branching units BU1 . . . BU64, only the branching units, e.g. BU1, BU56, BU60, BU64, associated with hub-nodes contribute significant loss on the trunk path 102, since only the branching units associated with hub-nodes are configured to add/drop signals to/from the trunk path 102. Each of the sub-nodes, e.g. Nodes 57 . . . Node 59 and Nodes 61 . . . Node 63, are coupled to one or more of the hub-nodes through an associated branching unit, e.g. BU57 . . . BU59 and BU61 . . . BU63, respectively. The branching units, e.g. BU57 . . . BU59 and BU61 . . . BU63, associated with the sub-nodes do not add/drop signals to/from the trunk path and do not contribute significant loss on the trunk path.

In general, the branching unit, e.g. BU60, associated with each hub node, e.g. Node 60, is configured to drop one or more aggregate signals to the associated hub node. The hub-node is configured to receive the aggregate signals from its associated branching unit and decode the signal on a specific associated wavelength. Each hub-node is configured to decode aggregate signals on a different wavelength from the others of the hub-nodes.

The aggregate signals decoded by each hub-node include data designated for the hub-node and data designated for one or more associated sub-nodes that are coupled to the hub-node. The data designated for the hub-node may be received by the hub-node. The data from the aggregate signal and designated for the sub-nodes is modulated on wavelengths associated with the sub-nodes and transmitted by the hub-node to the sub-nodes as associated sub-node signals. The sub-node signals are transmitted from the hub-node to the sub-nodes associated therewith through the branching units associated with the hub-node and the sub-node and through an associated sub-node path, e.g. paths 112 and 114, extending from the hub-node, e.g. Node 60, through the optical cable 103 and to the sub-node. The sub-node paths, e.g. paths 112 and 114, may include one or more dedicated fiber pairs within the cable 103 on which sub-node signals are transmitted from the hub-node to the associated sub-node, and/or may include single path within the cable 103 on which sub-node signals for multiple sub-nodes are multiplexed for transmission from the hub-node to the sub-nodes.

Each sub-node path, e.g. paths 112 and 114, is within the optical cable 103, but does not include any portion of the trunk path 102. With this configuration, sub-node signals to/from the sub-nodes may be sent to/from the hub-nodes without being provided on the trunk path. This avoids trunk path loss, e.g. branching unit loss, associated with communicating sub-node signals to/from the sub-nodes.

The sub-nodes e.g. Nodes 57 . . . Node 59 and Nodes 61 . . . Node 63, are configured to receive sub-node signals from their associated hub-nodes and decode sub-node signals on a specific wavelength associated with the sub-node. Sub-node signals transmitted from a sub-node and destined for the cable landing stations CLS1, CLS2, are modulated on the wavelength associated with the sub-node and transmitted to the hub-nodes associated with the sub-node through the associated sub-node path.

The hub-nodes associated with the sub-nodes are configured to receive sub-node signals from the associated sub-nodes at specific wavelengths associated with the sub-nodes and decode the data on the sub-node signals. The hub-nodes modulate the data from the sub-node signals along with data from the hub-node onto the wavelength associated with the hub-node and transmit an associated aggregate signal to one or more of the cable landing stations CLS1, CLS2.

For example, in the illustrated system 100, hub-nodes nodes, Nodes 1 and Node 64, respectively, immediately adjacent the cable landing stations, CLS1, CLS2, may be configured to support communication between one or more of the cable landing stations CLS1, CLS2 and three sub-nodes immediately adjacent thereto (not shown). The remaining the hub-nodes may be configured to support three sub-nodes preceding the hub-node and three sub-nodes following the hub-node. Additional fibers pairs may be provided in the optical cable 103 to establish the sub-node paths between the hub-nodes and their associated sub-nodes. For example, in the illustrated embodiment one or more additional fiber pairs may be provided in the optical cable 103 to establish a sub-node path 112 connecting Node 57 . . . Node 59 to Node 60 and one or more additional fiber pairs may be provided in the optical cable 103 to establish the sub-node path 114 connecting Node 61 . . . Node 63 to Node 60. Again, FIG. 1 is one example of a configuration consistent with the present disclosure. It is to be understood that a system consistent with the present disclosure may support any number and arrangement of hub-nodes and associated sub-nodes.

With continued reference to the system 100 illustrated in FIG. 1, the hub-node identified as Node 60, for example, may be configured to receive signals from the trunk path 102 through its associated branching unit, BU60 and branch path 110, and decode an aggregate signal on a specific associated wavelength. The aggregate signal decoded by the hub-node BU60 may include data designated for the hub-node BU60 and data designated for the sub-nodes Node 57 . . . Node59 and Node 61 . . . Node 63 that are coupled to the hub-node, Node 60. Data designated for the sub-nodes coupled to the hub-node is transmitted from the hub-node Node 60 as sub-node signals to the sub-nodes associated therewith Node 57 . . . Node 59 and Node 61 . . . Node 63 through the branching units BU60, BU57 . . . BU59 and BU61 . . . BU63, respectively, associated with the hub-node and the sub-nodes and the sub-node paths 112, 114, respectively. The sub-nodes are configured to receive the sub-node signals from their associated hub-nodes and decode signals on a specific wavelength associated with the sub-node.

Data transmitted from the sub-nodes, e.g. Node 57 . . . Node 59 and Node 61 . . . Node 63, and destined for the cable landing stations CLS1, CLS2, is modulated on the wavelength associated with the sub-node to provide sub-node signals. The sub-node signals are transmitted to the hub-nodes, e.g. Node 60, associated with the sub-nodes through the sub-node paths 112, 114, respectively, the branching units associated with the sub-node and any intervening branching units between the sub-node and the associated hub-nodes.

The hub-nodes, e.g. Node 60, associated with the sub-nodes Node 57 . . . Node 59 and Node 61 . . . Node 63 are configured to receive sub-node signals from the associated sub-nodes at specific wavelengths associated with the sub-nodes and decode the data on the sub-node signals. The hub-nodes, e.g. Node 60, modulate the data from the sub-nodes Node 57 . . . Node 59 and Node 61 . . . Node 63 along with data from the hub-node onto the wavelength associated with the hub-node and transmit that data as an aggregate signal to one or more of the cable landing stations CLS1, CLS2.

A configuration as shown for example in FIG. 1 may provide redundant communication from the sub-nodes to the cable landing stations CLS1, CLS2 by associating each of the sub-nodes with two different hub nodes. One of the hub-nodes associated with a sub-node may transmit aggregate signals including sub-node data on its associated wavelength west to a first one of the cable landing stations e.g. CLS1, while the other hub-node associated with the sub-node may transmit the aggregate signals including the same sub-node data on its associated wavelength east to the other of the cable landing stations, CLS2. Likewise, data destined for each sub-node may be replicated at each cable landing station CLS1, CLS2 and sent to the sub-node through two different hub-nodes.

For example, Node-60 may be configured to send data received from Node 61 . . . Node 63 east to the cable landing station CLS2, and to send data received from Node 57 . . . Node 59 west to the cable landing station CLS1. Meanwhile, Node 56 may be configured to send data received from Node 57 . . . Node59 east to the cable landing station CLS2, and to send data received from other sub-nodes (not shown) west to the cable landing station CLS1. Node 64 may be configured to send data received from Node 61 . . . Node 63 west to cable landing station CLS1. Data from the cable landing stations CLS1, CLS2 and destined for each sub-node may be replicated at each cable landing station and sent to the sub-nodes in the same way, i.e. through different associated hub-nodes. For example, data for Node 57 . . . Node 59 may be sent from cable landing station CLS1 through Node 60 and also from cable landing station CLS2 through Node 56.

Communication between the cable landing stations CLS1, CLS2 and the hub-nodes (the hub-node network) through the trunk path 102 may be established using known high capacity transponders, while communication between the hub-nodes and their associated sub-nodes (the sub-node network) may be accomplished using known lower capacity transponders having a capacity (or data rate) lower than the transponders used in the hub-node network. For example, the hub-node network may operate at a data rate of 40 Gb/s or 100 Gb/s and the sub-node network may operate at a data rate of 10 Gb/s. The lower capacity transponders used in sub-node network may be known, readily available and relatively low cost transponders.

A system consistent with the present disclosure allows for a significant reduction in the number of optical amplifiers/repeaters compared to known systems wherein a branching unit associated with each node contributes loss on the trunk path. In one non-limiting configuration, for example, a system including 64 nodes may nominally incur a 3 dB of loss for each of 64 branching units, resulting in a nominal loss on the trunk path of 192 dB for the 64 branching units alone. In a system consistent with the present disclosure, however, only the hub-nodes have associated branching units that contribute significant loss on the trunk path 102. In the system 100 shown in FIG. 1, for example, if the hub-nodes follow the illustrated pattern, there may be only 17 hub-nodes, resulting in a total nominal loss on the trunk path associated with branching units of 51 dB. The difference of 141 dB in loss between a known system and a system as shown for example in FIG. 1 may allow use of approximately nine fewer amplifiers/repeaters in a system consistent with the present disclosure. Although additional fibers added to the cable 103 to provide the sub-node paths, e.g. paths 112, 114, between the hub-nodes and sub-nodes, the savings in the number of repeaters/amplifiers may offset the cost of the additional fibers. In addition, the number of wavelengths required on the trunk path 102 in a system consistent with the present disclosure may be significantly less than required in a known system where a wavelength is provided for each node.

A system consistent with the present disclosure may be implemented in a variety of configurations. For example, any number and configuration of hub-nodes and sub-nodes may be provided, depending on system constraints and requirements. Also, the hub-node network may be configured using branching units with any known optical add-drop multiplexer (OADM) configuration. The OADM configuration associated with a branching unit may be disposed within a housing associated with the branching unit, or may be physically separate therefrom and in a different housing from the branching unit. The term "branching unit" as used herein thus refers to any configuration of elements in a common or separate housing for dropping one or more signals from a trunk path to a branch path, adding one or more signals from a branch path to a trunk path, passing one or more signals from one trunk path segment to another trunk path segment and/or passing one or more signals from one branch path to another branch path.

Figure 2:
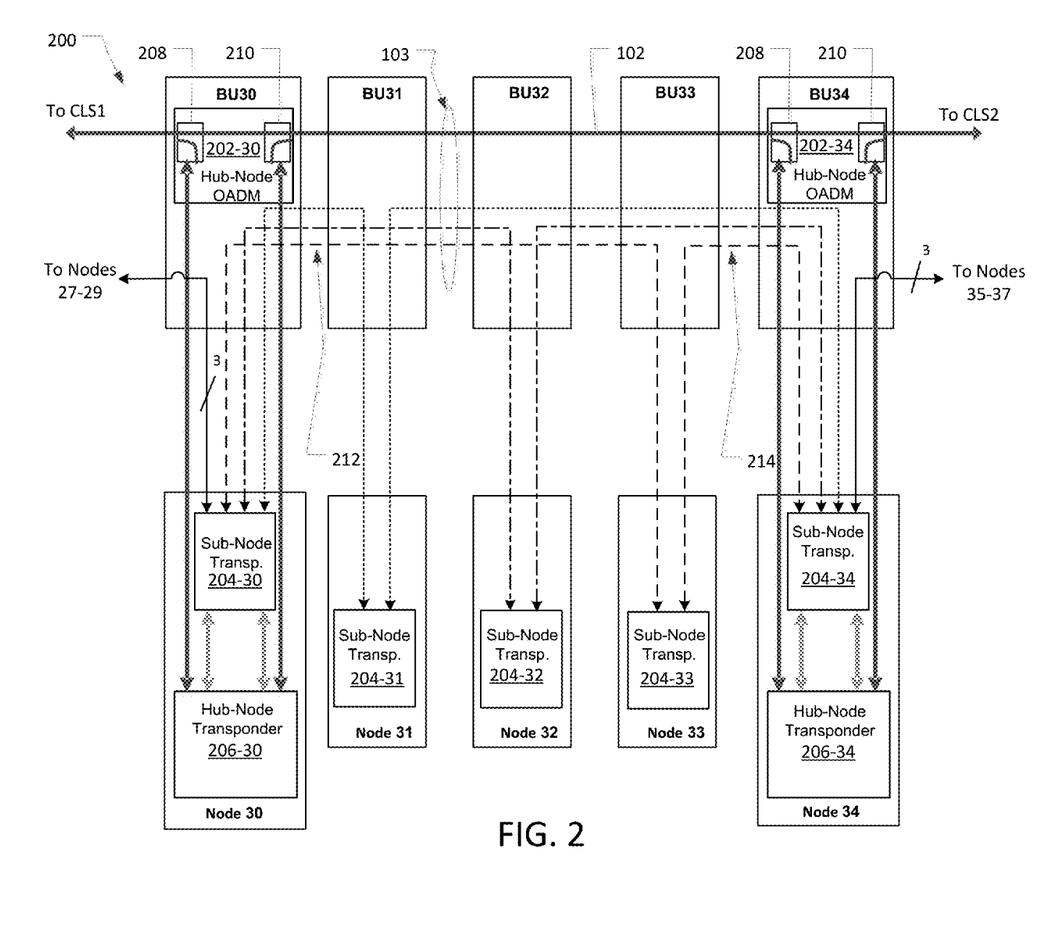
FIG. 2 is a schematic illustration of a portion of an optical communication system consistent with the present disclosure.

The sub-node network may be implemented using an OADM or non-OADM configuration. FIG. 2, for example illustrates a non-OADM configuration 200 of a sub-node network in a system consistent with the present disclosure. The configuration shown in FIG. 2 may be a portion of a system consistent with the present disclosure, e.g. a portion of the system 100 illustrated in FIG. 1, and includes consecutive hub-nodes, i.e. Nodes 30 and 34 and associated sub-nodes, i.e. Nodes 31 . . . 33. In the illustrated embodiment, branching units BU30 . . . BU34 are associated with Nodes 30-34, respectively.

The branching units BU30, BU34 associated with the hub nodes, Node 30 and Node 34, respectively, include hub-node OADMs 202-30 and 202-34, respectively. The hub-node OADMs 202-30 and 202-34 include broadband couplers 208, 210 for coupling aggregate signals to/from the trunk path 102 to/from associated hub-node transponders 206-30, 206-34 the hub-nodes Node 30, Node 34, respectively, The broadband couplers 208, 210 add to signal loss on the trunk path 102, e.g. about 3 dB in some embodiments, but ensure direct connectivity of signals from cable landing stations, e.g. CLS1 and CLS2 in FIG. 1, to the hub-nodes Node 30, Node 34. The branching units BU31 . . . BU33 associated with the sub-nodes, Node 31 . . . Node33, respectively, do not add or drop signals from the trunk path 102 and thus do not contribute to signal loss on the trunk path 102.

The hub-node transponders 206-30, 206-34 are configured to send and receive aggregate signals to and/from the cable landing stations CLS1, CLS2 through the branching units BU30, BU34, e.g. at a relatively high data rate of, for example, 40 Gb/s or 100 Gb/s. The hub-node transponders 206-30, 206-34 decode the aggregate signals modulated on a single associated wavelength. The data encoded in the aggregate signals may be intended for the hub-nodes Node 30, Node 34 and one or more of the sub-nodes Node 31 . . . Node33 and may be time-division multiplexed.

The hub-nodes 206-30, 206-34 include associated sub-node transponders 204-30, and 204-34, respectively. The hub-node transponders 206-30, 206-34 may decode and receive the data intended for the hub-node and may send data intended for the sub-nodes to the sub-node transponders 204-30, 204-34, respectively. The sub-node transponders 204-30, 204-34, respectively may modulate the data intended for the sub-nodes Node 31 . . . Node33 to provide sub-node signals, and may transmit the sub-node signals to the associated sub-nodes Node 31 . . . Node33 through associated sub-node paths 213, 214 including direct-fiber connections within the branching units associated with the sub-nodes BU31-BU33. Sub-node signals associated with each sub-node Node 31 . . . Node33 may be received by an associated sub-node transponder 204-31, 204-32, 204-33, respectively, within the sub-node. The sub-node transponders 204-31, 204-32, 204-33 within the sub-nodes may decode the sub-node signals received thereby. The sub-node transponders 204-31, 204-32, 204-33 may also be configured to send sub-node signals to the sub-node transponders 204-30, 204-34 within the hub-nodes Node 30, Node 34 through the sub-node paths 212, 214 and the branching units associated BU30 . . . BU34 with the sub-nodes and the hub-node. The sub-node transponders 204-31, 204-32, 204-33 in the sub-nodes may be configured to send and receive sub-node signals to/from the sub-node transponders 204-30, 204-34 in the hub-nodes Node 30, Node 34 at a relatively low data rate of, for example, 10 Gb/s.

Sub-node signals received by the sub-node transponders 204-30, 204-34 from the sub-nodes Node 31 . . . Node33 may be decoded and provided to the hub-node transponders 206-30, 206-34, respectively. The hub-node transponders 206-30, 206-34 may aggregate data, e.g. using time-division multiplexing, from the sub-nodes and from the hub-node and modulate the data onto the wavelength associated with the hub-node to provide an aggregate signal. The hub-node transponder 206-30, 206-34 may transmit the aggregate signal on the trunk path 102 through the hub-node OADMs 202-30, 202-34.

To provide redundancy, data intended for the sub-nodes Node 31 . . . Node33 may be provided to both hub-nodes Node 30 and Node 34 e.g. from CLS1 and CLS2 in FIG. 1, and transmitted to the sub-nodes Node 31 . . . Node33 from both of the hub-nodes Node 30, Node 34. Likewise, data from the sub-nodes Node 31 . . . Node33 may be provided to both of the hub-nodes Node 30, Node 34 and transmitted from the hub-nodes Node 30, Node 34 to the different cable landing stations, e.g. CLS1 and CLS 2 in FIG. 1. Each of the hub-nodes Node 30, Node 34 may also communicate data to/from other sub-nodes adjacent thereto, e.g. Nodes 27-29 (not shown) and Nodes 35-37 (not shown), respectively.

Figure 3:
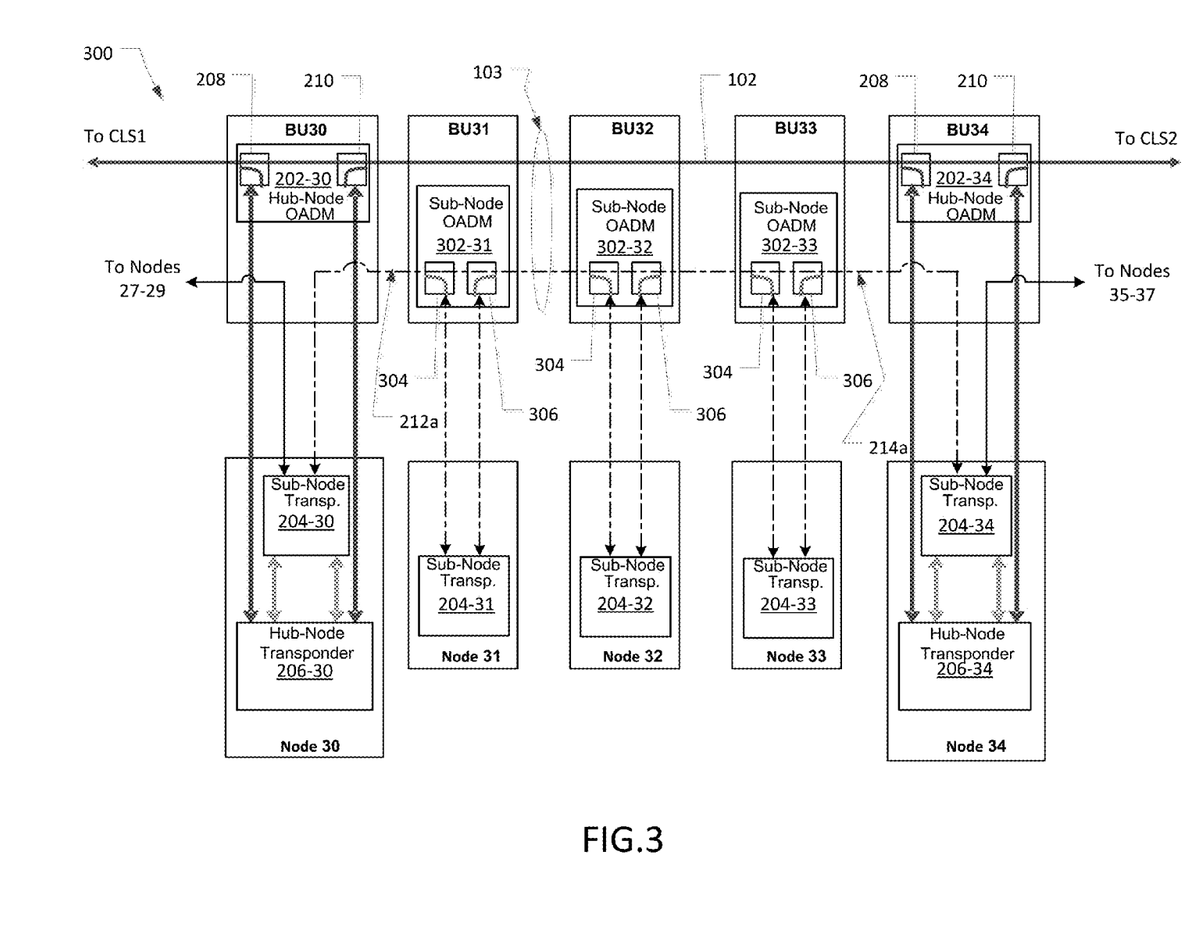
FIG. 3 is a schematic illustration of a portion of another optical communication system consistent with the present disclosure.

FIG. 3 illustrates one example 300 of a OADM configuration of a sub-node network in a system consistent with the present disclosure. The configuration shown in FIG. 3 may be a portion of a system consistent with the present disclosure, e.g. a portion of the system 100 illustrated in FIG. 1, and includes consecutive hub-nodes, i.e. Node 30 and Node 34 and associated sub-nodes, i.e. Node 31 . . . Node 33. In general, the configuration 300 of FIG. 3 differs from the configuration 200 shown in FIG. 2 in that the embodiment of FIG. 3 includes sub-node OADMs 302-31, 302-32 and 302-33 in the branching units BU31 . . . BU33, respectively, associated with the sub-nodes Node 31 . . . Node 33. Since the configuration and operation of other components illustrated in FIG. 3 is the same as those shown in FIG. 2, description thereof will not be repeated.

In the illustrated configuration 300, the sub-node transponders 204-30, 204-34 in the hub-nodes Node 30, Node 34, respectively, send and receive an aggregate signal to/from the sub-node transponders 204-31, 204-32, 204-33 in the sub-nodes Node 31 . . . Node 33 through the sub-node OADMS 302-31, 302-32 and 302-33, respectively. The aggregate signals to/from the sub-nodes Node 31 . . . Node 33 may be multiplexed on the sub-node paths 212a, 214a, each of which may include a single fiber pair. The sub-node OADMS 302-31, 302-32 and 302-33 include broad band couplers 304, 306 for coupling aggregate signals to/from associated sub-node transponders 204-31, 204-32, 204-33 through the sub-node paths 212a, 214a. This configuration may require only a single additional fiber pair in the optical cable 103 for establishing the sub-node paths 212a, 214a.

Figure 4:
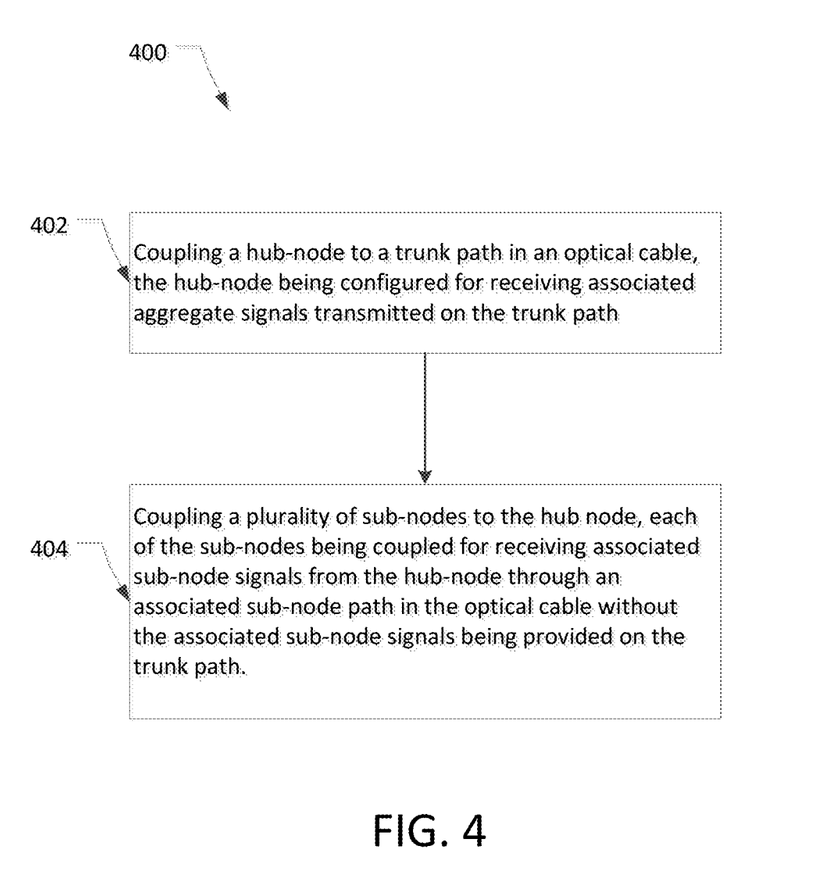
FIG. 4 is a flowchart illustrating one example of a method consistent with the present disclosure.

FIG. 4 is a block flow diagram for a method 400 of configuring an optical communication system consistent with the present disclosure. The illustrated block flow diagram may be shown and described as including a particular sequence of steps. The illustrated sequence of steps in merely provides an example of how the general functionality described herein can be implemented. The steps do not have to be executed in the order presented unless otherwise indicated. In addition, it is to be understood that other embodiments consistent with the present disclosure may include sub-combinations of the illustrated steps and/or additional steps described herein. Thus, claims presented herein may be directed to all or part of the components and/or operations depicted in one or more figures.

The illustrated embodiment includes coupling 402 a hub-node to a trunk path in an optical cable, the hub-node being configured for receiving associated aggregate signals transmitted on the trunk path; and coupling 404 a plurality of sub-nodes to the hub node, each of the sub-nodes being coupled for receiving associated sub-node signals from the hub-node through an associated sub-node path in the optical cable without the associated sub-node signals being provided on the trunk path.

According to one aspect of the present disclosure there is provided an optical communication system including first and second cable landing stations coupled to a trunk path in an optical cable; at least one hub-node, each of the hub-nodes being coupled to the trunk path through an associated hub-node branching unit; and at least one sub-node, each of the sub-nodes being coupled to at least one of the hub-nodes through an associated sub-node branching unit and an associated sub-node path in the optical cable, the sub-node path not including the trunk path whereby sub-node signals may be communicated between each of the sub-nodes and the at least one of the hub-nodes coupled thereto without being provided on the trunk path.

According to another aspect of the present disclosure, there is an optical communication system: first and second cable landing stations coupled to a trunk path in an optical cable; a hub-node coupled to the trunk path through an associated hub-node branching unit for receiving associated aggregate signals from at least one of the first and second cable landing stations, the associated aggregate signals comprising associated sub-node data, the hub-node being configured to provide sub-node signals; and a plurality of sub-nodes, each of the sub-nodes being coupled to the hub-node through an associated sub-node branching unit and a sub-node path in the optical cable, whereby each of the sub-nodes is configured for receiving an associated one of the sub-node signals through the sub-node path without the associated ones of the sub-node signals being provided on the trunk path.

According to another aspect of the disclosure, there is provided a method of configuring an optical communication system: coupling a hub-node to a trunk path in an optical cable, the hub-node being configured for receiving associated aggregate signals transmitted on the trunk path; and coupling a plurality of sub-nodes to the hub node, each of the sub-nodes being coupled for receiving associated sub-node signals from the hub-node through an associated sub-node path in the optical cable without the associated sub-node signals being provided on the trunk path.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Elements, components, modules, and/or parts thereof that are described and/or otherwise portrayed through the figures to communicate with, be associated with, and/or be based on, something else, may be understood to so communicate, be associated with, and/or be based on in a direct and/or indirect manner, unless otherwise stipulated herein.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements. As used herein, use of the term "nominal" or "nominally" when referring to an amount means a designated or theoretical amount that may vary from the actual amount.

While the principles of the invention have been described herein, it is to be understood by those skilled in the art that this description is made only by way of example and not as a limitation as to the scope of the invention. Other embodiments are contemplated within the scope of the present invention in addition to the embodiments shown and described herein. Modifications and substitutions by one of ordinary skill in the art are considered to be within the scope of the present invention, which is not to be limited except by the following claims.

What is claimed is:

1. An optical communication system comprising:
   first and second cable landing stations coupled to a trunk path in an optical cable;
   at least one hub-node, each of the hub-nodes being coupled to the trunk path through an associated hub-node branching unit; and
   a plurality of sub-nodes, each of the plurality of sub-nodes being coupled to the at least one hub-nodes through an associated sub-node branching unit and an associated sub-node path in the optical cable, the associated sub-node path not including the trunk path and whereby sub-node signals may be communicated between each of the plurality sub-nodes and the at least one hub-nodes coupled thereto without being provided on the trunk path.

2. The optical communication system of claim 1, wherein the at least one hub-node comprises a first hub-node and a second hub-node, and wherein each of the plurality of sub-nodes are coupled to the first and second hub-nodes through the associated sub-node branching unit and the associated sub-node path.

3. The optical communication system of claim 1, wherein each of the at least one hub-nodes is configured to send and receive aggregate signals on the trunk path at a first data rate and to send and receive sub-node signals to and from ones of the plurality of sub-nodes coupled thereto at a second data rate lower than the first data rate.

4. The optical communication system of claim 1, wherein each of the at least one hub-nodes is configured to send and receive aggregate signals to and from the trunk path on a different associated wavelength.

5. The optical communication system of claim 1, wherein at least one of the associated sub-node branching units directly connects optical fibers to provide the associated sub-node path.

6. The optical communication system of claim 1, wherein at least one of the associated sub-node branching units comprises an optical add-drop multiplexer.

7. The optical communication system of claim 1, wherein the at least one hub-node comprises a plurality of hub-nodes, and wherein at least one hub-node of the plurality of hub-nodes comprises a hub node transponder configured for sending and receiving aggregate signals to and from the trunk path and a sub-node transponder configured for sending and receiving sub-node signals to and from the associated sub-node path.

8. An optical communication system comprising:
   first and second cable landing stations coupled to a trunk path in an optical cable;
   a first hub-node coupled to the trunk path through an associated hub-node branching unit for receiving associated aggregate signals from at least one of the first and second cable landing stations, the associated aggregate signals comprising associated sub-node data, the first hub-node being configured to provide sub-node signals; and
   a plurality of sub-nodes, each of the sub-nodes being coupled to the first hub-node through an associated sub-node branching unit and a sub-node path in the optical cable, whereby each of the sub-nodes is configured for receiving an associated one of the sub-node signals through the sub-node path without the associated ones of the sub-node signals being provided on the trunk path.

9. The optical communication system of claim 8, the system further comprising:
   a second hub-node coupled to the trunk path through an second associated hub-node branching unit for receiving second associated aggregate signals from at least one of the first and second cable landing stations, the second associated aggregate signals comprising second associated sub-node data, the second hub-node being configured to provide second sub-node signals,
   wherein the plurality of sub-nodes are coupled to the second hub-node through the associated sub-node branching units and a second sub-node path in the optical cable, whereby each of the sub-nodes is configured for receiving an associated one of the second sub-node signals through the second sub-node path without the associated ones of the second sub-node signals being provided on the trunk path.

10. The optical communication system of claim 9, wherein the first and second hub-nodes are configured to receive the aggregate signals and the second aggregate signals, respectively, on different associated wavelengths.

11. The optical communication system of claim 8, wherein the first hub-node is configured to receive the aggregate signals at a first data rate and to send associated ones of the sub-node signals on the sub-node path at a second data rate lower than the first data rate.

12. The optical communication system of claim 8, wherein at least one of the sub-node branching units directly connects optical fibers to provide the sub-node path.

13. The optical communication system of claim 8, wherein at least one of the associated sub-node branching units comprises an optical add-drop multiplexer.

14. The optical communication system of claim 8, wherein the first hub-node comprises a hub node transponder configured for sending and receiving aggregate signals to and from the trunk path and a sub-node transponder configured for sending and receiving the sub-node signals to and from the sub-node path.

15. A method of configuring an optical communication system, the method comprising:
coupling first and second cable landing stations to a trunk path in an optical cable;
coupling a first hub-node to the trunk path in the optical cable, the first hub-node being configured for receiving associated aggregate signals transmitted on the trunk path; and
coupling a plurality of sub-nodes to the first hub node, each of the sub-nodes being coupled for receiving associated sub-node signals from the first hub-node and each of the sub-nodes of the plurality of sub-nodes through an associated sub-node path in the optical cable without the associated sub-node signals being provided on the trunk path.

16. The method of claim 15 further comprising:
coupling a second hub-node to the trunk path, the second hub-node being configured for receiving second associated aggregate signals transmitted on the trunk path, each of the plurality of sub-nodes being coupled for receiving associated second sub-node signals from the second hub-node through a second associated sub-node path in the optical cable without the associated second sub-node signals being provided on the trunk path.

17. The method of claim 16, wherein the first and second hub-nodes are configured to receive the aggregate signals and the second aggregate signals, respectively, on different associated wavelengths.

18. The method of claim 15, wherein the first hub-node is configured to receive the aggregate signals at a first data rate and to send the associated sub-node signals at a second data rate lower than the first data rate.

19. The method of claim 15, wherein the first hub-node comprises a hub node transponder configured for sending and receiving aggregate signals to and from on the trunk path and a sub-node transponder configured for sending and receiving the associated sub-node signals to and from the sub-node path.

20. The optical communication system of claim 1, wherein the trunk path comprises a first optical fiber pair and the associated sub-node path comprises a second optical fiber pair different than the first optical fiber pair.

\* \* \* \* \*